United States Patent [19]
Yamahara et al.

[11] 3,914,268
[45] Oct. 21, 1975

[54] PROCESS FOR PREPARING AROMATIC ORGANIC ISOCYANATES

[75] Inventors: Takeshi Yamahara, Kobe; Schichird Takamatsu, Takatsuki; Takashi Deguchi, Ibaragi; Masahiro Usui, Takatsuki; Kenichi Hirose, Takatsuki; Hiroshi Yoshihara, Takatsuki, all of Japan

[73] Assignee: Sumitomo Chemical Company, Limited, Japan

[22] Filed: Mar. 7, 1973

[21] Appl. No.: 338,866

[30] Foreign Application Priority Data
Mar. 7, 1972 Japan................................. 47-23699
Apr. 5, 1972 Japan................................. 47-34691
Apr. 25, 1972 Japan................................. 47-41831
Aug. 16, 1972 Japan................................. 47-82332
Aug. 18, 1972 Japan................................. 47-83074

[52] U.S. Cl........ 260/453 PC; 252/429 B; 252/430; 252/432; 252/441; 252/472
[51] Int. Cl.² ...................................... C07C 118/06
[58] Field of Search ................ 260/453 PC, 453 SP

[56] References Cited
UNITED STATES PATENTS
3,461,149  8/1969  Hardy et al......................... 260/453
3,576,835  4/1971  Smith et al.......................... 260/453
3,654,279  4/1972  Hurley, Jr. et al.............. 260/453 X Primary Examiner—Lewis Gotts
Assistant Examiner—Dolph H. Torrence
Attorney, Agent, or Firm—Stewart and Kolasch, Ltd.

[57] ABSTRACT

In the production of an aromatic organic isocyanate by contacting an aromatic nitro compound and carbon monoxide in the presence of a catalyst system comprising a platinum group metal compound with or without an aromatic nitrogenous heterocyclic compound, an improved process wherein the said catalyst system includes further at least one of water, hydrogen, hydrogen halides, boric acids, formic acid, oxalic acid and formaldehyde. By such improved process a much higher reaction rate and a markedly excellent yield are attained.

16 Claims, No Drawings

PROCESS FOR PREPARING AROMATIC ORGANIC ISOCYANATES

The present invention relates to a process for preparing aromatic organic isocyanates. More particularly, it relates to a process for preparing aromatic isocyanates from aromatic nitro compounds and carbon monoxide.

For preparation of aromatic isocyantes from aromatic nitro compounds and carbon monoxide in the presence of an appropriate catalyst, there have been known a variety of processes. For example, In Belgian Pat. No. 651,876, there is proposed a process where a platinum group metal or its halide or oxide is used as a catalyst. The process, however, does not give sufficiently high yields to be applicable to industrial manufacture. In German Pat. No. 1,815,517, there is disclosed another process where a composition comprising a halide of a noble metal and an aromatic nitrogenous heterocyclic compound is employed as a catalyst. Further, in Dutch Pat. application No. 68.02765, the use of a composition comprising a halide or an oxide of palladium or rhodium and an oxide of vanadium, molybdenum, tungsten, niobium, chromium or tantalum as a catalyst is disclosed. However, these catalysts are also unsatisfactory, because the reaction rate or the selectivity to the objective compound is not sufficiently high.

As the result of an extensive study, it has been found that the use of a novel catalyst system in the reaction of an aromatic nitro compound with carbon monoxide gives the desired aromatic isocyanate in a high yield with a high reaction rate.

The process of the present invention comprises contacting an aromatic nitro compound and carbon monoxide at a high temperature under an elevated pressure in the presence of a catalyst system comprising a platinum group metal compound with or without an aromatic nitrogenous heterocyclic compound and at least one member selected from the group consisting of water, hydrogen, hydrogen halides, boric acids, formic acid, oxalic acid and formaldehyde.

As the platinum group metal compound in the catalyst system of the invention, there may be favorably used a halide or an oxide of palladium, rhodium, iridium, ruthenium, platinum or osmium. The halide includes the fluoride, chloride, bromide and iodide. A carbonyl halide may be understood to fall within the category of the said halide and can be favorably employed. Specific examples are palladium fluoride, palladium chloride, palladium bromide, palladium iodide, rhodium chloride, rhodium bromide, rhodium iodide, iridium chloride, ruthenium chloride, platinum chloride, osmium chloride, palladium chlorocarbonyl, rhodium chlorocarbonyl, iridium chlorocarbonyl, osmium chlorocarbonyl, ruthenium iodocarbonyl, etc.

There may be also employed advantageously a complex of the said halide of a platinum group metal with an aromatic nitrogenous heterocyclic compound as hereinafter stated, which is representable by the formula:

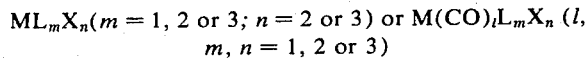

$ML_mX_n$ ($m = 1, 2$ or $3$; $n = 2$ or $3$) or $M(CO)_lL_mX_n$ ($l, m, n = 1, 2$ or $3$)

wherein M represents a platinum group metal, L represents an aromatic nitrogenous heterocyclic compound and X represents a halogen atom. Specific examples are palladium chloride-pyridine complex $(Pd(C_5H_5N)_2Cl_2)$, palladium chloride-isoquinoline complex $(Pd(C_9H_7N)_2Cl_2)$, rhodium chloride-pyridine complex $(Rh(C_5H_5N)_3Cl_3)$, etc.

The aromatic nitrogenous heterocyclic compound may be, for instance, an aromatic, 6-membered nitrogenous heterocyclic, monocyclic or polycyclic compound which may bear an appropriate substituent such as a halogen atom, an alkyl group having 1 to 40 carbon atoms, or an aryl, alkenyl, cyano, aldehydo, alkoxy, phenoxy, thioalkoxy, thiophenoxy, carboalkoxy, carbamyl, carboaryloxy or thiocarbamyl radical.

Examples of the aromatic, 6-membered nitrogenous heterocyclic, monocyclic or polycyclic compound are pyridine, 2-chloropyridine, 2-bromopyridine, 2-fluoropyridine, 4-phenylpyridine, 2-methylpyridine, 2-methyl-5-ethylpyridine, 2,6-dimethylpyridine, 2,4,6-trimethylpyridine, 2-vinylpyridine, 2-styrylpyridine, 3-chloropyridine, 2,6-dichloropyridine, 2-chloro-4-methylpyridine, 4-phenylthiopyridine, 2-methoxypyridine, phenyl α-picolinate, methyl γ-picolinate, 2,6-dicyanopyridine, α-picolinic aldehyde, α-picolineamide, 5,6,7,8-tetrahydroquinoline, 2,2'-dipyridyl, quinoline, isoquinoline, 2-chloroquinoline, acridine, phenanthridine, 1,5-naphthyridine, 1,6-naphthyridine, 1,7-naphthyridine, 1,8-naphthyridine, 2,6-naphthyridine, 2,7-naphthyridine, benzo[h]quinoline, benzo[f]quinoline, benzo[g]quinoline, benzo[h]isoquinoline, benzo[f]isoquinoline, benzo[g]isoquinoline, pyrazine, pyrimidine, pyridazine, quinazoline, phthalazine, quinoxaline, phenazine, etc.

In the present invention, the use of at least one member selected from the group consisting of water, hydrogen, hydrogen halides, boric acids, formic acid, oxalic acid and formaldehyde as a constituent of the catalyst system is essential. By the use of them, a much higher reaction rate and a markedly excellent yield as compared with the case of not using them can be attained. This is entirely of surprising and unexpected nature, because the prior art rather suggests the contrary. For example, Belgian Pat. No. 651,876 states that, when a platinum group metal or its halide or oxide is employed as a catalyst, the reaction should be effected under a condition substantially free from water or hydrogen.

The incorporation of water may be effected in any optional manner and is usually carried out by dissolving the starting material therein or admixing the reaction solvent therewith.

Hydrogen may be incorporated in the reaction system solely or in admixture with carbon monoxide.

Examples of the hydrogen halide include hydrogen fluoride, hydrogen chloride, hydrogen bromide and hydrogen iodide.

The boric acid may be, for instance, orthoboric acid $(H_3BO_3)$, metaboric acid $(HBO_2)$, tetraboric acid $(H_3B_4O_7)$, hypoboric acid $(B_2(OH)_4)$, boric anhydride $(B_2O_3)$, boron suboxide $(B_2O_2)$ or any other boron oxide hydrate.

Formic acid, oxalic acid and formaldehyde may be employed as such or in the form of adducts or salts with any other compounds. Thus, sodium formate, ammonium formate, oxalic acid hydrate, sodium oxalate, S-trioxane, paraformaldehyde and the like can be used.

In the catalyst system of the invention, there may be also incorporated at least one oxide selected from the group consisting of vanadium oxides, molybdenum oxides, tungsten oxides, niobium oxides, chromium oxides and tantalum oxides as the constituent. Examples of such oxides are chromic oxide, chromium dioxide, chromous oxide, molybdenum sesquioxide, molybdenum dioxide, molybdenum trioxide, niobium monoxide, niobium dioxide, niobium pentoxide, ditantalum dioxide, ditantalum tetroxide, ditantalum pentoxide, tungsten oxide, divanadium dioxide, divanadium trioxide, divanadium tetroxide, divanadium pentoxide, etc.

In the catalyst system of the invention, the molar ratio of the aromatic nitrogenous heterocyclic compound to the platinum group metal compound may be in the range of from 0.1 to 10, preferably of from 1 to 4. The molar ratio of the additional component selected from the group consisting of water, hydrogen, hydrogen halides, boric acids, formic acid, oxalic acid and formaldehyde to the platinum group metal compound may be in a range of from 0.01 to 10, preferably of from 0.1 to 5. The amount of the oxide which may be optionally incorporated is usually from 0.01 to 10 moles per 1 mole of the platinum group metal compound.

The starting aromatic nitro compound in this invention is an aromatic compound having at least one nitro group on the aromatic ring, which may bear any other additional substituent. Examples of the aromatic nitro compound includes nitrobenzene, m-dinitrobenzene, o-dinitrobenzene, p-dinitrobenzene, p-nitrotoluene, 2,4-dinitrotoluene, 2,6-dinitrotoluene, 2,4-dinitro-m-xylene, 4,6-dinitro-m-xylene, p,p'-dinitrodiphenylmethane, 2,4-dinitroanisole, 2,6-dinitroanisole, etc.

The process of the present invention can be carried out without the use of a solvent, but an appropriate organic solvent may be employed when desired. The solvent may include aromatic, aliphatic and alicyclic hydrocarbons such as benzene, toluene, xylene, methylnaphthalene, dimethylnaphthalene, n-heptane and cyclohexane, and halogenated hydrocarbons and their derivatives such as dichloromethane, carbon tetrachloride, trichlorofluoromethane, monochlorobenzene, dichlorobenzene trichlorobenzene, monochloronaphthalene, chlorinated diphenyl and chlorinated diphenyl ether.

On the basis of the amount of the starting aromatic nitro compound, the platinum group metal compound in the catalyst system may be used in an amount of 0.01 to 50 mol %, preferably 1 to 20 mol %.

The partial pressure of carbon monoxide may be from 10 to 1500 atm., preferably from 100 to 1000 atm. The reaction temperature is usually from 100° to 250°C, preferably from 150° to 220°C.

To enable the reaction time to be favorably short is one of the major advantages attained by the present invention. Though the reaction time may vary depending upon the kind and amount of the catalyst system to be used, temperature, pressure and so on, usually a reaction time of from one-half hour to 10 hours is sufficient to obtain the desired degree of the reaction.

The aromatic isocyanates produced by the present invention are known to be useful in the manufacture of polyurethane foams and other elastomers, and also as reaction intermediates in the preparation of coating compositions, foamed and molded plastics, drying oils and resins.

The following examples are illustrative of the invention and are not intended to be limitative thereof.

EXAMPLE 1

In a 50 ml volume autoclave, there are charged 2,4-dinitrotoluene (2.5 g), benzene (8 g), bis(pyridine)palladium chloride (0.24 g) and water (0.013 g), and the contents are heated at 190°C for 3 hours under a carbon monoxide atmosphere (maximum pressure, 235 kg/cm$^2$). After the reaction, the autoclave is cooled, and the product is taken out and analyzed. It is confirmed that 90 % of the starting 2,4-dinitrotoluene is reacted and 2,4-tolylene diisocyanate is obtained in a yield of 27%. The total yield of all the isocyanate compounds produced including 4-isocyanato-2-nitrotoluene and 2-isocyanato-4-nitrotoluene is 76%.

When the reaction is effected as above but in the absence of water, the following results are obtained: the conversion of the starting 2,4-dinitrotoluene, 50%; the yield of 2,4-tolylene diisocyanate, 4%; the total yield of all the isocyanate compounds produced, 45%.

EXAMPLE 2

The reaction of 2,4-dinitrotoluene with carbon monoxide is carried out in the same manner as in Example 1 except that the amount of water is changed to 0.006 g whereby the following results are obtained: the conversion of the starting 2,4-dinitrotoluene, 75%; the yield of 2,4-tolylene diisocyanate, 13%; the total yield of all the isocyanate compounds produced, 68%.

EXAMPLE 3

In a 50 ml volume autoclave, there are charged 2,4-dinitrotoluene (2.5 g), bis(isoquinoline)palladium chloride (0.302 g), o-dichlorobenzene (10 ml) and water (0.01 g), and the contents are stirred at 180°C for 4 hours under a carbon monoxide atmosphere (maximum pressure, 220 kg/cm$^2$). After the reaction, the autoclave is cooled, and the product is taken out and analyzed. The results are as follows: the conversion of the starting 2,4-dinitrotoluene, 92%; the yield of 2,4-tolylene diisocyanate, 23%; the total yield of all the isocyanate compounds produced, 85%.

When the reaction is effected as above but in the absence of water, the following results are obtained: the conversion of the starting 2,4-dinitrotoluene, 60%; the yield of 2,4-tolylene diisocyanate, 7%; the total yield of all the isocyanate compounds produced, 58%.

EXAMPLE 4

In a 100 ml volume autoclave, there are charged 2,4-dinitrotoluene (5 g), toluene (20 ml), palladium chloride (0.12 g), pyridine (0.16 g) and water (0.025 g), and the contents are stirred at 180°C for 4 hours under a carbon monoxide atmosphere (maximum pressure, 449 kg/cm$^2$). After the reaction, the autoclave is cooled, and the product is taken out and analyzed. The results are as follows: the conversion of the starting 2,4-dinitrotoluene, 98%; the yield of 2,4-tolylene diisocyanate, 48%; the total yield of all the isocyanate compounds produced, 91%.

When the reaction is effected as above but in the absence of water, the following results are obtained: the conversion of the starting 2,4-dinitrotoluene, 67%; the yield of 2,4-tolylene diisocyanate, 9%; the total yield of all the isocyanate compounds produced, 63%.

EXAMPLE 5

In a 60 ml volume autoclave, there are charged 2,4- dinitrotoluene (2.5 g), benzene (10 ml), tris(pyridine)rhodium chloride (0.3 g) and water (0.012 g), and the contents are stirred at 190°C for 4 hours under a carbon monoxide atmosphere (maximum pressure, 220 kg/cm²). After the reaction, the autoclave is cooled, and the product is taken out and analyzed. The results are as follows: the conversion of the starting 2,4-dinitrotoluene, 71%; the yield of 2,4-tolylene diisocyanate, 26%; the total yield of all the isocyanate compounds produced, 64%.

When the reaction is effected as above but in the absence of water, the following results are obtained: the conversion of the starting 2,4-dinitrotoluene, 53%; the yield of 2,4-tolylene diisocyanate, 4%; the total yield of all the isocyanate compounds produced, 33%.

EXAMPLE 6

In a 50 ml volume autoclave, there are charged 2,4-dinitrotoluene (2.5 g), benzene (10 ml), bis(pyridine)-palladium chloride (0.24 g), molybdenum trioxide (0.2 g) and water (0.012 g), and the contents are stirred at 180°C for 6 hours under a carbon monoxide atmosphere (maximum pressure, 222 kg/cm²). After the reaction, the autoclave is cooled, and the product is taken out and analyzed. The results are as follows: the conversion of the starting 2,4-dinitrotoluene, 98%; the yield of 2,4-tolylene diisocyanate, 49%; the total yield of all the isocyanate compounds produced, 83%.

When the reaction is effected as above but in the absence of water, the following results are obtained: the conversion of the starting 2,4-dinitrotoluene, 62%; the yield of 2,4-tolylene diisocyanate, 7%; the total yield of all the isocyanate compounds produced, 57%.

EXAMPLE 7

In a 50 ml volume autoclave, there are charged 2,4-dinitrotoluene (2.5 g), benzene (10ml), bis(pyridine)-palladium chloride (0.24 g), tungsten oxide (0.16 g) and water (0.01 g), and the contents are stirred at 190°C for 3 hours under a carbon monoxide atmosphere (maximum pressure, 210 kg/cm²). After the reaction, the autoclave is cooled, and the product is taken out and analyzed. The results are as follows: the conversion of the starting 2,4-dinitrotoluene, 86.9%; the yield of 2,4-tolylene diisocyanate, 21.3%; the total yield of all the isocyanate compounds produced, 74.1%.

When the reaction is effected as above but in the absence of water, the following results are obtained: the conversion of the starting 2,4-dinitrotoluene, 51.3%; the yield of 2,4-tolylene diisocyanate, 1.6%; the total yield of all the isocyanate compounds produced, 34.6%.

EXAMPLE 8

In a 100 ml volume autoclave, there are charged 2,4-dinitrotoluene (5 g), o-dichlorobenzene (20 ml), bis-(isoquinoline)palladium chloride (0.305 g) and water (0.013 g), and the contents are stirred at 188°C for 3 hours under a carbon monoxide atmosphere (maximum pressure, 460 kg/cm²). After the reaction, the autoclave is cooled, and the product is taken out and analyzed. The results are as follows: the conversion of the starting 2,4-dinitrotoluene, 92.8%; the yield of 2,4-tolylene diisocyanate, 32.3%; the total yield of all the isocyanate compounds produced, 80.0%.

When the reaction is effected as above but in the absence of water, the following results are obtained: the conversion of the starting 2,4-dinitrotoluene, 78.6%; the yield of 2,4-tolylene diisocyanate, 15.8%; the total yield of all the isocyanate compounds produced, 70.5%.

EXAMPLE 9

In a 100 ml volume autoclave, there are charged 2,4-dinitrotoluene (5 g), benzene (20 ml), bis-(isoquinoline)palladium chloride (0.305 g), molybdenum trioxide (0.101 g) and water (0.013 g), and the contents are stirred at 194°C for 2 hours under a carbon monoxide atmosphere (maximum pressure, 472 kg/cm²). After the reaction, the autoclave is cooled, and the product is taken out and analyzed. The results are as follows: the conversion of the starting 2,4-dinitrotoluene, 97.8%; the yield of 2,4-tolylene diisocyanate, 47.0%; the total yield of all the isocyanate compounds produced, 84.0%.

EXAMPLE 10

In a 100 ml volume autoclave, there are charged 2,4-dinitrotoluene (5 g), benzene (20 ml), palladium-chlorocarbonyl complex (0.238 g), isoquinoline (0.181 g) and water (0.013 g), and the contents are stirred at 188°C for 3 hours under a carbon monoxide atmosphere (maximum pressure, 460 kg/cm²). After the reaction, the autoclave is cooled, and the product it taken out and analyzed. The results are as follows: the conversion of the starting 2,4-dinitrotoluene, 94.3%; the yield of 2,4-tolylene diisocyanate, 39.8%; the total yield of all the isocyanate compounds produced, 81.3%.

When the reaction is effected as above but in the absence of water, the following results are obtained: the conversion of the starting 2,4-dinitrotoluene, 81.5%; the yield of 2,4-tolylene diisocyanate, 18.6%; the total yield of all the isocyanate compounds produced, 73.2%.

EXAMPLE 11

In a 50 ml volume stainless steel autoclave equipped with a magnetic stirrer, there are charged 2,4-dinitrotoluene (2.50 g), bis(pyridine)palladium chloride (0.117 g) and benzene (10 ml), and the inner atmosphere is replaced by nitrogen. After the temperature is lowered to a temperature of dry ice and the pressure is reduced, hydrogen (16 ml) of 18°C is introduced therein. The temperature is raised to room temperature, and carbon monoxide is introduced therein until the inner pressure becomes 150 kg/cm². The reaction is carried out at 190°C for 4 hours under stirring. After cooling, the product is taken out and subjected to gas chromatographic analysis. The results are as follows: the conversion of the starting 2,4-dinitrotoluene, 52.4%; the yield of 2,4-tolylene diisocyanate, 5.3%; the total yield of all the isocyanate compounds produced, 51.5%.

When the reaction is effected as above but in the absence of hydrogen, the following results are obtained: the conversion of the starting 2,4-dinitrotoluene, 38.1%; the yield of 2,4-tolylene diisocyanate, 2.3%; the total yield of all the isocyanate compounds produced, 37.0%.

EXAMPLE 12

The reaction of 2,4-dinitrotoluene with carbon monoxide is carried out in the same manner as in Example 11 except that the amount of hydrogen is changed to 53 ml whereby the following results are obtained: the conversion of the starting 2,4-dinitrotoluene, 75.7%; the yield of 2,4-tolylene diisocyanate, 10.0%; the total yield of all the isocyanate compounds produced, 66.0%.

EXAMPLE 13

In a 50 ml volume stainless steel autoclave equipped with a magnetic stirrer, there are charged 2,4-dinitrotoluene (2.50 g), bis(pyridine)palladium chloride (0.235 g), molybdenum trioxide (0.200 g) and benzene (10 ml), and the contents are then treated in the same manner as in Example 11 except that the amount of hydrogen is changed to 17 ml and the reaction time is changed to 3 hours. The results are as follows: the conversion of the starting 2,4-dinitrotoluene, 84.5%; the yield of 2,4-tolylene diisocyanate, 25.2%; the total yield of all the isocyanate compounds produced, 80.4%.

When the reaction is effected as above but in the absence of hydrogen, the following results are obtained: the conversion of the starting 2,4-dinitrotoluene, 55.0%; the yield of 2,4-tolylene diisocyanate 5.2%; the total yield of all the isocyanate compounds produced, 47.6%.

EXAMPLE 14

In a 100 ml volume autoclave, there are charged 2,4-dinitrotoluene (5.00 g), palladium chloride (0.120 g), pyridine (0.160 g) and toluene (20 ml). After hydrogen (32 ml) is introduced therein as in Example 11, carbon monoxide is introduced therein until the inner pressure becomes 300 kg/cm$^2$. The reaction is carried out at 180°C for 4 hours under stirring. The autoclave is cooled, and the product is taken out and analyzed. The results are as follows: the conversion of the starting 2,4-dinitrotoluene, 95.4%; the yield of 2,4-tolylene diisocyanate, 39.5%; the total yield of all the isocyanate compounds produced, 81.9%.

EXAMPLE 15

The reaction of 2,4-dinitrotoluene with carbon monoxide is carried out in the same manner as in Example 11 except that hydrogen chloride is used in place of hydrogen. The results are as follows: the conversion of the starting 2,4-dinitrotoluene, 62.4%; the yield of 2,4-tolylene diisocyanate, 5.7%; the total yield of all the isocyanate compounds produced, 52.6%.

EXAMPLE 16

The reaction of 2,4-dinitrotoluene with carbon monoxide is carried out in the same manner as in Example 13 except that hydrogen chloride (16 ml) is used in place of hydrogen. The results are as follows: the conversion of the starting 2,4-dinitrotoluene, 79.6%; the yield of 2,4-tolylene diisocyanate, 18.7%; the total yield of all the isocyanate compounds produced, 70.0%.

EXAMPLE 17

In a 50 ml volume stainless steel autoclave, there are charged 2,4-dinitrotoluene (2.5 g), benzene (8 g), bis(pyridine)palladium chloride (0.237 g) and orthoboric acid (0.022 g), and the contents are stirred at 190°C for 3 hours under a carbon monoxide atmosphere (maximum pressure, 217 kg/cm$^2$). After the reaction, the autoclave is cooled, and the product is taken out and analyzed. The results are as follows: the conversion of the starting 2,4-dinitrotoluene, 82%; the yield of 2,4-tolylene diisocyanate, 21%; the total yield of all the isocyanate compounds produced, 72%.

EXAMPLES 18 to 23

The reaction is carried out as in Example 17 under the conditions indicated in Table 1. The results are shown in Table 1.

Table 1

| Example No. | Catalyst Component | Amount (g) | Aromatic nitro compound Kind | Amount (g) | Solvent Kind | Amount (g) | Maximum pressure of CO (kg/cm$^2$) | Reaction temperature (°C) | Reaction time (hrs.) |
|---|---|---|---|---|---|---|---|---|---|
| 18 | PdCl$_2$<br>Pyridine<br>H$_3$BO$_3$ | 0.12<br>0.11<br>0.022 | 2,4-Dinitrotoluene | 2.5 | o-Dichlorobenzene | 10 | 230 | 190 | 5 |
| 19* | Pd(C$_9$H$_7$N)$_2$Cl$_2$<br>H$_3$BO$_3$ | 0.31<br>0.044 | 2,4-Dinitrotoluene | 2.5 | Benzene | 8 | 213 | 190 | 5 |
| 20** | Rh(C$_5$H$_5$N)$_3$Cl$_3$<br>H$_3$BO$_3$ | 0.31<br>0.043 | 2,4-Dinitrotoluene | 2.5 | Benzene | 8 | 202 | 190 | 3 |
| 21** | Pd(C$_5$H$_5$N)$_2$Cl$_2$<br>H$_3$BO$_3$ | 0.24<br>0.022 | Nitrobenzene | 1.7 | Benzene | 8 | 210 | 190 | 5 |
| 22** | Pd(C$_5$H$_5$N)$_2$Cl$_2$<br>HBO$_2$ | 0.24<br>0.031 | 2,4-Dinitrotoluene | 2.5 | Benzene | 8 | 235 | 210 | 3 |
| 23 | Pd(CO)Cl<br>Isoquinoline<br>H$_3$BO$_3$ | 0.24<br>0.18<br>0.044 | 2,4-Dinitrotoluene | 2.5 | Benzene | 8 | 225 | 190 | 5 |

| Example No. | Conversion of aromatic nitro compound (%) | Yield of 2,4-tolylene diisocyanate (%) | Total yield of all isocyanate compounds produced (%) |
|---|---|---|---|
| 18 | 82.1 | 20.8 | 71.4 |
| 19 | 96.2 | 43.9 | 86.1 |
| 20 | 86.4 | 13.8 | 68.4 |
| 21 | 91.3 | — | 75.8 (Phenyl isocyanate) |
| 22 | 96.1 | 40.1 | 79.7 |
| 23 | 97.2 | 48.5 | 86.3 |

Note: *C$_9$H$_7$N: isoquinoline.
**C$_5$H$_5$N: pyridine.

EXAMPLES 24 to 28

In a 300 ml volume stainless steel autoclave equipped with a magnetic stirrer, there are charged 2,4-dinitrotoluene (25 g), palladium chloride (0.621 g), pyridine (1.13 ml), an additive as shown in Table 2 (3.5 mmol) and benzene (100 ml), and carbon monoxide is introduced therein with a pressure of 170 kg/cm$^2$. The autoclave is placed in an oil bath, and the reaction is effected at 195°C for 5 hours under stirring. After cooling, the product is taken out and subjected to gas chromatographic analysis. The results are shown in Table 2.

Table 2

| Example No. Additive | 24 HCOOH | 25 HCOONa | 26 (COOH)$_2$ | 27 (CH$_2$O)$_n$ | 28 — |
|---|---|---|---|---|---|
| Conversion of DNT*) (%) | 96.4 | 78.5 | 91.8 | 88.2 | 75.5 |
| Yield of TDI**) (%) | 20.5 | 8.5 | 19.8 | 10.9 | 5.7 |
| Total yield***) (%) | 81.5 | 70.0 | 77.8 | 74.1 | 61.6 |

Note: L6In Example No. 28, no additive is used.
*):2,4-Dinitrotoluene.
**):2,4-Tolylene diisocyanate.
***):The total yield of all the isocyanate compounds produced, i.e. 2,4-tolylene diisocyanate, 4-isocyanato-2-nitrotoluene and 2-isocyanato-4-nitrotoluene.

EXAMPLE 29

In a 50 ml volume stainless steel autoclave equipped with a magnetic stirrer, there are charged 2,4-dinitrotoluene (2.50 g), bis(pyridine)palladium chloride (0.117 g), formic acid (0.016 g) and benzene (10 ml), and carbon monoxide is introduced therein until the inner pressure becomes 150 kg/cm$^2$. The reaction is carried out at 190°C for 4 hours under stirring. After cooling, the product is taken out and analyzed. The results are as follows: the conversion of the starting 2,4-dinitrotoluene, 73.7%; the yield of 2,4-tolylene diisocyanate, 13.2%; the total yield of all the isocyanate compounds produced, 66.7%.

EXAMPLE 30

In a 50 ml volume stainless steel autoclave equipped with a magetic stirrer, there are charged 2,4-dinitrotoluene (2.50 g), bis(pyridine)palladium chloride (0.235 g), molybednum trioxide (0.200 g), formic acid (0.032 g) and benzene (10 ml), and carbon monoxide is introduced therein until the inner pressure becomes 150 kg/cm$^2$. The reaction is carried out at 190°C for 3 hours under stirring. After cooling, the product is taken out and analyzed. The results are as follows: the conversion of the starting 2,4-dinitrotoluene, 88.5%; the yield of 2,4-tolylene diisocyanate, 30.1%; the total yield of all the isocyanate compounds produced, 81.5%.

What is claimed is:

1. In the production of an aromatic organic isocyanate by contacting an aromatic nitro compound and carbon monoxide in the presence of a catalyst system comprising a platinum group metal compound selected from the group consisting of a halide or an oxide of palladium rhodium, iridium, ruthenium, platinum or osmium, the improvement wherein said catalyst includes at least one additional constituent selected from the group consisting of water, hydrogen, boric acids, formic acid, oxalic acid and formaldehyde, the molar ratio of said additional catalytic constituent with respect to said platinum group metal compound being from 0.01 to 10.

2. The process according to claim 1, wherein the aromatic nitro compound is an aromatic compound having at least one nitro group on the aromatic ring.

3. The process according to claim 2, wherein the aromatic nitro compound is a member selected from the group consisting of nitrobenzene, m-dinitrobenzene, o-dinitrobenzene, p-dinitrobenzene, p-nitrotoluene, 2,4-dinitrotoluene, 2,6-dinitrotoluene, 2,4-dinitro-m-xylene, 4,6-dinitro-m-xylene, p,p'-dinitrodiphenylmethane, 2,4-dinitroanisole and 2,6-dinitroanisole.

4. The process according to claim 1, wherein the platinum group metal compound is a member selected from the group consisting of palladium fluoride, palladium chloride, palladium bromide, palladium iodide, rhodium chloride, rhodium bromide, rhodium iodide, iridium chloride, ruthenium chloride, platinum chloride, osmium chloride, palladium chlorocarbonyl, rhodium chlorocarbonyl, iridium chlorocarbonyl, osmium chlorocarbonyl and ruthenium iodocarbonyl.

5. The process according to claim 1, wherein the platinum group metal compound is a complex compound of the formula:

$$ML_mX_n \ (m = 1, 2 \text{ or } 3; n = 2, \text{ or } 3) \text{ or } M(CO)_lL_mX_n$$
$$(l, m, n = 1, 2 \text{ or } 3)$$

wherein M represents a platinum group metal, L represents an aromatic nitrogenous heterocyclic compound and X represents a halogen atom.

6. The process according to claim 1, wherein the platinum group metal compound in the catalyst system is used in an amount of 0.01 to 50 mol % on the basis of the amount of the starting aromatic nitro compound.

7. The process according to claim 1, wherein the partial pressure of the carbon monoxide is from 10 to 1500 atm.

8. The process according to claim 1, wherein the reaction temperature is from 100° to 250°C.

9. The process according to claim 1, wherein the catalyst system comprises additionally an aromatic nitrogenous heterocyclic compound, the molar ratio of said aromatic nitrogenous heterocyclic compound with respect to said platinum group metal compound being from 0.1 to 10.

10. The process according to claim 9, wherein the aromatic nitrogenous heterocyclic compound is a member selected from the group consisting of pyridine, 2-chloropyridine, 2-bromopyridine, 2-fluoropyridine, 4-phenylpyridine, 2-methylpyridine, 2-methyl-5-ethylpyridine, 2,6-dimethylpyridine, 2,4,6-trimethylpyridine, 2-vinylpyridine, 2-styrylpyridine, 3-chloropyridine, 2,6-dichloropyridine, 2-chloro-4-methylpyridine, 4-phenylthiopyridine, 2-methoxypyridine, phenyl α-picolinate, methyl γ-picolinate, 2,6-dicyanopyridine, α-picolinic aldehyde, α-picolineamide, 5,6,7,8-tetrahydroquinoline, 2,2'-dipyridyl, quinoline, isoquinoline, 2-chloroquinoline, acridine, phenanthridine, 1,5-naphthyridine, 1,6-naphthyridine, 1,7-naphthyridine, 1,8-naphthyridine, 2,6-naphthyridine, 2,7-naphthyridine, benzo[h]quinoline, benzo[f]quinoline, benzo[g]quinoline, benzo[h]isoquinoline, benzo[f]isoquinoline, benzo[g]isoquinoline, pyrazine, pyrimidine, pyridazine, quinazoline, phtharazine, quinoxaline and phenazine.

11. The process according to claim 9, wherein the catalyst system comprises additionally at least one oxide selected from the group consisting of vanadium oxides, molybdenum oxides, tungsten oxides, niobium oxides, chromium oxides and tantalum oxides.

12. The process according to claim 1, wherein said boric acids are selected from the group consisting of orthoboric acid, metaboric acid, tetraboric acid, hypoboric acid, boric anhydride and boron suboxide.

13. The process according to claim 1, wherein the formic acid, oxalic acid or formaldehyde is present in said catalyst as such or in the form of an adduct or salt thereof.

14. The process according to claim 1, wherein the molar ratio of said additional catalytic constituent with respect to said platinum group metal compound is from 0.1 to 5.

15. The process according to claim 1, wherein the molar ratio of said aromatic nitrogenous heterocyclic compound with respect to said platinum group metal compound is from 1 to 4.

16. The process according to claim 11, wherein the catalyst system comprises from 0.01 to 10 moles of said oxide per 1 mole of said platinum group metal compound.

* * * * *

UNITED STATES PATENT OFFICE
CERTIFICATE OF CORRECTION

Patent No. 3,914,268   Dated October 21, 1975

Inventor(s) Takeshi Yamahara et al

It is certified that error appears in the above-identified patent and that said Letters Patent are hereby corrected as shown below:

IN THE TITLE PAGE:

Change the first name of the second inventor from "Schichird" to -- Shichiro --

Signed and Sealed this thirteenth Day of April 1976

[SEAL]

Attest:

RUTH C. MASON
*Attesting Officer*

C. MARSHALL DANN
*Commissioner of Patents and Trademarks*